(12) United States Patent
Christenson

(10) Patent No.: US 10,900,577 B2
(45) Date of Patent: Jan. 26, 2021

(54) SHUTTLE VALVE TEMPERATURE CONTROL ASSEMBLY

(71) Applicant: B/E Aerospace, Inc., Winston-Salem, NC (US)

(72) Inventor: Justin C. Christenson, Everett, WA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 74 days.

(21) Appl. No.: 15/942,799

(22) Filed: Apr. 2, 2018

(65) Prior Publication Data

US 2018/0284818 A1   Oct. 4, 2018

Related U.S. Application Data

(60) Provisional application No. 62/481,313, filed on Apr. 4, 2017.

(51) Int. Cl.
*G05D 23/13* (2006.01)
*F16K 11/07* (2006.01)

(52) U.S. Cl.
CPC .......... *F16K 11/0716* (2013.01); *F16K 11/07* (2013.01); *G05D 23/1306* (2013.01); *G05D 23/1393* (2013.01)

(58) Field of Classification Search
CPC ............... G05D 23/13; G05D 23/1306; G05D 23/1313; G05D 23/1393; F16K 11/00; F16K 11/02; F16K 11/06; F16K 11/065; F16K 11/07; F16K 11/0716
See application file for complete search history.

(56) References Cited

U.S. PATENT DOCUMENTS

| | | | | | |
|---|---|---|---|---|---|
| 2,855,151 | A | * | 10/1958 | Lesovsky | G05D 23/1393 236/12.14 |
| 3,004,710 | A | * | 10/1961 | Couffer, Jr. | G05D 23/1393 236/12.2 |
| 3,087,675 | A | * | 4/1963 | Honegger | G05D 23/1353 236/12.21 |
| 3,120,854 | A | * | 2/1964 | Shimooka | G05D 23/1313 137/98 |

(Continued)

FOREIGN PATENT DOCUMENTS

EP   2045687 A2   4/2009

*Primary Examiner* — Jonathan Bradford
(74) *Attorney, Agent, or Firm* — Locke Lord LLP; Joshua L. Jones; Scott D. Wofsy

(57) ABSTRACT

A valve assembly for mixing water from hot and cold water sources to obtain water at a resulting intermediate temperature that is suitable for hand washing or the like, including: a housing defining an internal fluid flow channel in fluid communication with a hot water inlet port that selectively supplies a hot water flow to the internal fluid flow channel and a cold water inlet port that selectively supplies a cold water flow to the internal fluid flow channel; and a valve member disposed within the internal fluid flow channel operable for simultaneously partially or wholly obstructing the hot water flow from the hot water inlet port to the internal fluid flow channel and the cold water flow from the cold water inlet port to the internal fluid flow channel such that each contributes a predetermined proportional water flow to the internal fluid flow channel.

18 Claims, 6 Drawing Sheets

(56) References Cited

U.S. PATENT DOCUMENTS

| | | | | |
|---|---|---|---|---|
| 3,561,481 | A | * | 2/1971 | Taplin ................ G05D 11/003 137/625.4 |
| 4,444,215 | A | * | 4/1984 | Zukausky .......... G05D 23/1313 137/490 |
| 4,926,897 | A | * | 5/1990 | Perrott ................ F16K 11/0746 137/98 |
| 4,955,535 | A | * | 9/1990 | Tsutsui ............... G05D 23/1393 137/606 |
| 5,033,671 | A | * | 7/1991 | Shiba ................ G05D 23/1393 236/12.12 |
| 5,504,950 | A | | 4/1996 | Natalizia et al. |
| 6,290,139 | B1 | * | 9/2001 | Kolze ................ G05D 23/1393 236/12.11 |
| 2004/0149831 | A1 | * | 8/2004 | Sheeran ............ G05D 23/1393 236/12.1 |
| 2009/0250128 | A1 | * | 10/2009 | Emmons ................ F16K 11/07 137/625.11 |
| 2014/0251475 | A1 | * | 9/2014 | Marty ................ G05D 23/1313 137/624.27 |

\* cited by examiner

SHUTTLE VALVE TEMPERATURE CONTROL ASSEMBLY

CROSS-REFERENCE

The present patent application/patent claims the benefit of priority of U.S. Provisional Patent Application No. 62/481,313, filed on Apr. 4, 2017, and entitled "SHUTTLE VALVE TEMPERATURE CONTROL," the contents of which are incorporated in full by reference herein.

TECHNICAL FIELD

The present disclosure relates generally to a valve assembly for mixing water from hot and cold water sources to obtain water at a resulting temperature that is suitable for hand washing or the like, especially in an air transportation application or the like. More specifically, the present disclosure relates to a shuttle valve temperature control assembly incorporating a solenoid-controlled flow valve and a servo-controlled shuttle valve that is selectively translated and/or rotated to vary the relative flow rates of both the hot and cold water flows to achieve a resulting water mixture that has a desired temperature. Virtually any resulting temperature from the low temperature of the cold water flow alone to the high temperature of the hot water flow alone is thereby achievable, with a desirably high degree of user selectivity.

BACKGROUND

Conventional hot/cold water mixing faucets often utilize a lever or knobs to manually control water flow from hot and cold water inlets to adjust overall water temperature. When the lever is lifted, for example, the output port of the faucet is opened. The water temperature is then adjusted by moving the lever to the left or the right. This process is replicated by turning the hot and cold water knobs to a greater or lesser extent, when such knobs are utilized. For example, moving the lever to the left maximizes water flow from the hot water inlet and minimizes water flow from the cold water inlet, while moving the lever to the right maximizes water flow from the cold water inlet and minimizes water flow from the hot water inlet. Other configurations can, of course, be utilized. In any event, adjusting the lever to positions between the left limit and the right limit mixes the hot and cold water flows to a corresponding intermediate degree. Typically, this hot and cold water mixing occurs within the faucet neck, which results in a heterogeneous water temperature at the output port.

More recently, touchless faucets have replaced lever and knob mechanisms, particularly in public-use applications, where avoiding contact with the faucet and the associated contamination is desirable. Such touchless faucets may be sensor-activated for convenience, thereby obviating the need for levers and knobs. Water temperature is set to a predetermined temperature that is suitable to most users and adjustable by mechanically or electronically controlling the mix from the hot and cold water input valves, one dedicated to controlling the water flow from the hot water input and one dedicated to controlling the water flow from the cold water input. Other touchless faucets offer some degree of user selection with regard to water temperature.

Although the above-described faucets provide a degree of water temperature adjustment, such adjustments are undesirably stepped and/or imprecise. As such, they do not provide for virtually infinite water temperature adjustability. Further, the manner in which the hot and cold water are mixed fails to produce a consistent, homogeneous water temperature at the output port. In public use applications, such as aboard an aircraft or the like, it is often desirable to provide virtually infinite temperature adjustability and homogeneous output water temperature via a compact, lightweight package for cost savings and weight savings purposes, and for ease of maintenance. The shuttle valve temperature control assembly of the present disclosure provides such advantages, among others.

SUMMARY

In various aspects, embodiments of the inventive concepts disclosed herein are directed to a valve assembly for mixing water from hot and cold water sources to obtain water at a resulting temperature that is suitable for hand washing or the like, especially in an air transportation application or the like. More specifically, the present disclosure relates to a shuttle valve temperature control assembly incorporating a solenoid-controlled flow valve and a servo-controlled shuttle valve that is selectively translated and/or rotated to vary the relative flow rates of both the hot and cold water flows to achieve a resulting water mixture that has a desired temperature. Virtually any resulting temperature from the low temperature of the cold water flow alone to the high temperature of the hot water flow alone is thereby achievable, with a desirably high degree of user selectivity.

In one aspect, embodiments of the inventive concepts disclosed herein are directed to a valve assembly for mixing water from hot and cold water sources to obtain water at a resulting intermediate temperature that is suitable for hand washing or the like, including: a housing defining an internal fluid flow channel in fluid communication with a hot water inlet port that selectively supplies a hot water flow to the internal fluid flow channel and a cold water inlet port that selectively supplies a cold water flow to the internal fluid flow channel; and a valve member disposed within the internal fluid flow channel operable for simultaneously partially or wholly obstructing the hot water flow from the hot water inlet port to the internal fluid flow channel and the cold water flow from the cold water inlet port to the internal fluid flow channel such that each contributes a predetermined proportional water flow to the internal fluid flow channel. The valve member includes a translating slider that simultaneously partially or wholly obstructs the hot water flow from the hot water inlet port to the internal fluid flow channel and the cold water flow from the cold water inlet port to the internal fluid flow channel when translated within the internal fluid flow channel. Alternatively, the valve member includes a rotating member that simultaneously partially or wholly obstructs the hot water flow from the hot water inlet port to the internal fluid flow channel and the cold water flow from the cold water inlet port to the internal fluid flow channel when rotated within the internal fluid flow channel. The valve assembly is coupled to and actuated by an electric motor. The valve assembly is configured to be actuated in a continuous manner such that a continuous range of resulting water temperatures can be achieved in the internal fluid flow channel from a low water temperature associated with the cold water inlet to a high water temperature associated with the hot water inlet. The internal fluid flow channel is in fluid communication with an internal fluid delivery channel defined within one or more of the housing and another housing coupled to or integrally formed with the housing, wherein turbulent mixing of the hot and cold water flows is promoted within the internal fluid delivery channel such that a potentially heterogeneous hot/cold water mix within the internal fluid flow channel is made homogeneous in the internal fluid delivery channel. The valve assembly further includes a water outlet port coupled to the housing, wherein the water outlet port is configured to be coupled to a outlet of a faucet. The valve assembly still further includes an on-off obstruction valve coupled to the internal fluid flow channel configured to selectively block a flow of warm water from the internal fluid flow channel. The on-off obstruction valve is coupled to and actuated by an electric motor. Optionally, the valve assembly is disposed on an aircraft.

In another aspect, embodiments of the inventive concepts disclosed herein are directed to a faucet, including: a valve assembly for mixing water from hot and cold water sources to obtain water at a resulting intermediate temperature that is suitable for hand washing or the like, including: a housing defining an internal fluid flow channel in fluid communication with a hot water inlet port that selectively supplies a hot water flow to the internal fluid flow channel and a cold water inlet port that selectively supplies a cold water flow to the internal fluid flow channel; and a valve member disposed within the internal fluid flow channel operable for simultaneously partially or wholly obstructing the hot water flow from the hot water inlet port to the internal fluid flow channel and the cold water flow from the cold water inlet port to the internal fluid flow channel such that each contributes a predetermined proportional water flow to the internal fluid flow channel. The valve member includes a translating slider that simultaneously partially or wholly obstructs the hot water flow from the hot water inlet port to the internal fluid flow channel and the cold water flow from the cold water inlet port to the internal fluid flow channel when translated within the internal fluid flow channel. Alternatively, the valve member includes a rotating member that simultaneously partially or wholly obstructs the hot water flow from the hot water inlet port to the internal fluid flow channel and the cold water flow from the cold water inlet port to the internal fluid flow channel when rotated within the internal fluid flow channel. The valve assembly is coupled to and actuated by an electric motor. The valve assembly is configured to be actuated in a continuous manner such that a continuous range of resulting water temperatures can be achieved in the internal fluid flow channel from a low water temperature associated with the cold water inlet to a high water temperature associated with the hot water inlet. The internal fluid flow channel is in fluid communication with an internal fluid delivery channel defined within one or more of the housing and another housing coupled to or integrally formed with the housing, wherein turbulent mixing of the hot and cold water flows is promoted within the internal fluid delivery channel such that a potentially heterogeneous hot/cold water mix within the internal fluid flow channel is made homogeneous in the internal fluid delivery channel. The valve assembly further includes a water outlet port coupled to the housing, wherein the water outlet port is configured to be coupled to a outlet of a faucet. The valve assembly further includes an on-off obstruction valve coupled to the internal fluid flow channel configured to selectively block a flow of warm water from the internal fluid flow channel. The on-off obstruction valve is coupled to and actuated by an electric motor. Optionally, the faucet is disposed on an aircraft.

Embodiments of the inventive concepts can include one or more or any combination of the above aspects, features, and configurations.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

The inventive concepts are described hereinafter with reference to the accompanying drawings in which exemplary embodiments are shown. However, the inventive concepts may be embodied in many different forms and should not be construed as limited to the representative embodiments set forth herein.

Figure 1:
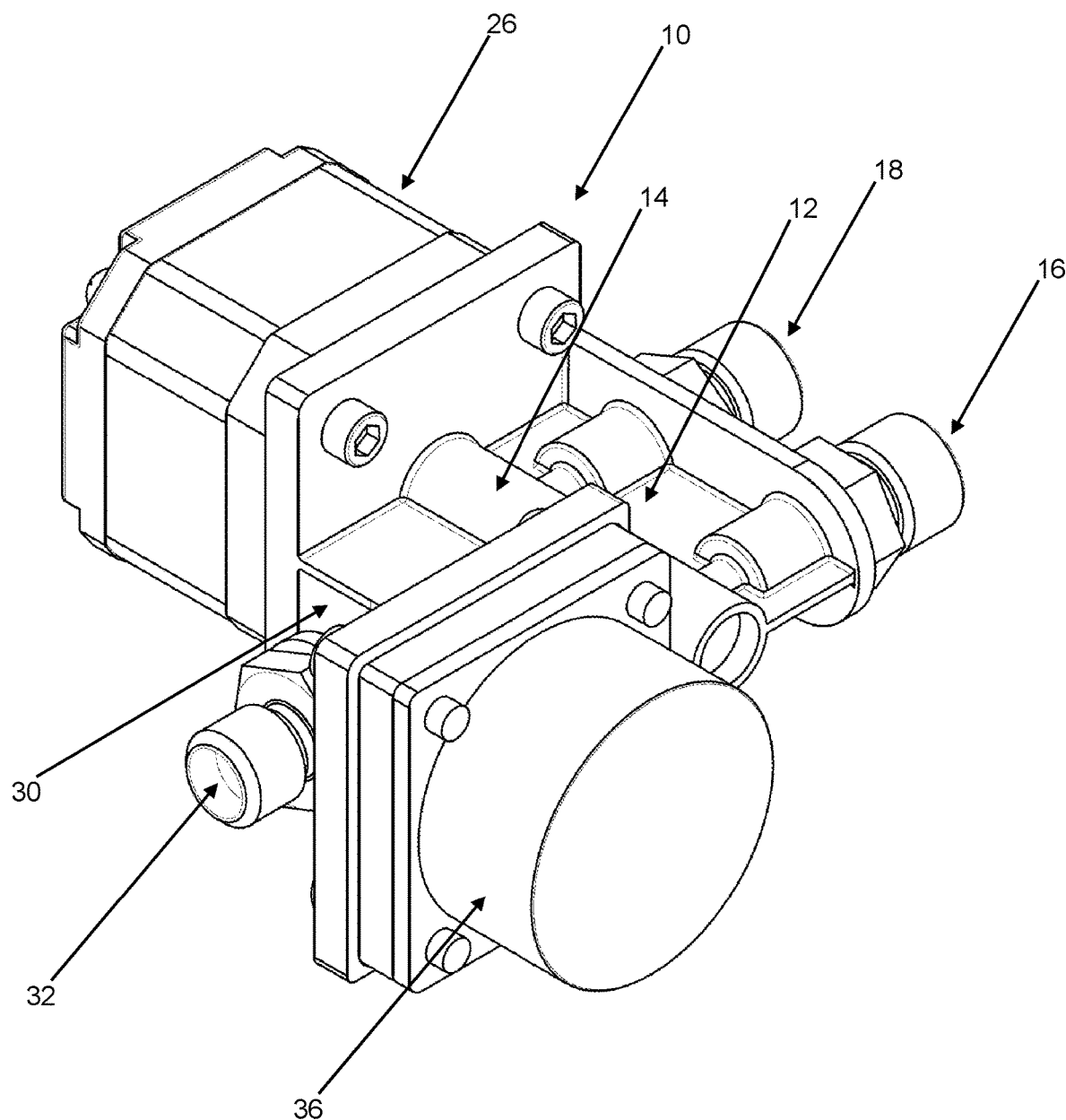
FIG. 1 is a perspective view of one exemplary embodiment of the shuttle valve temperature control assembly of the present disclosure.
Figure 2:
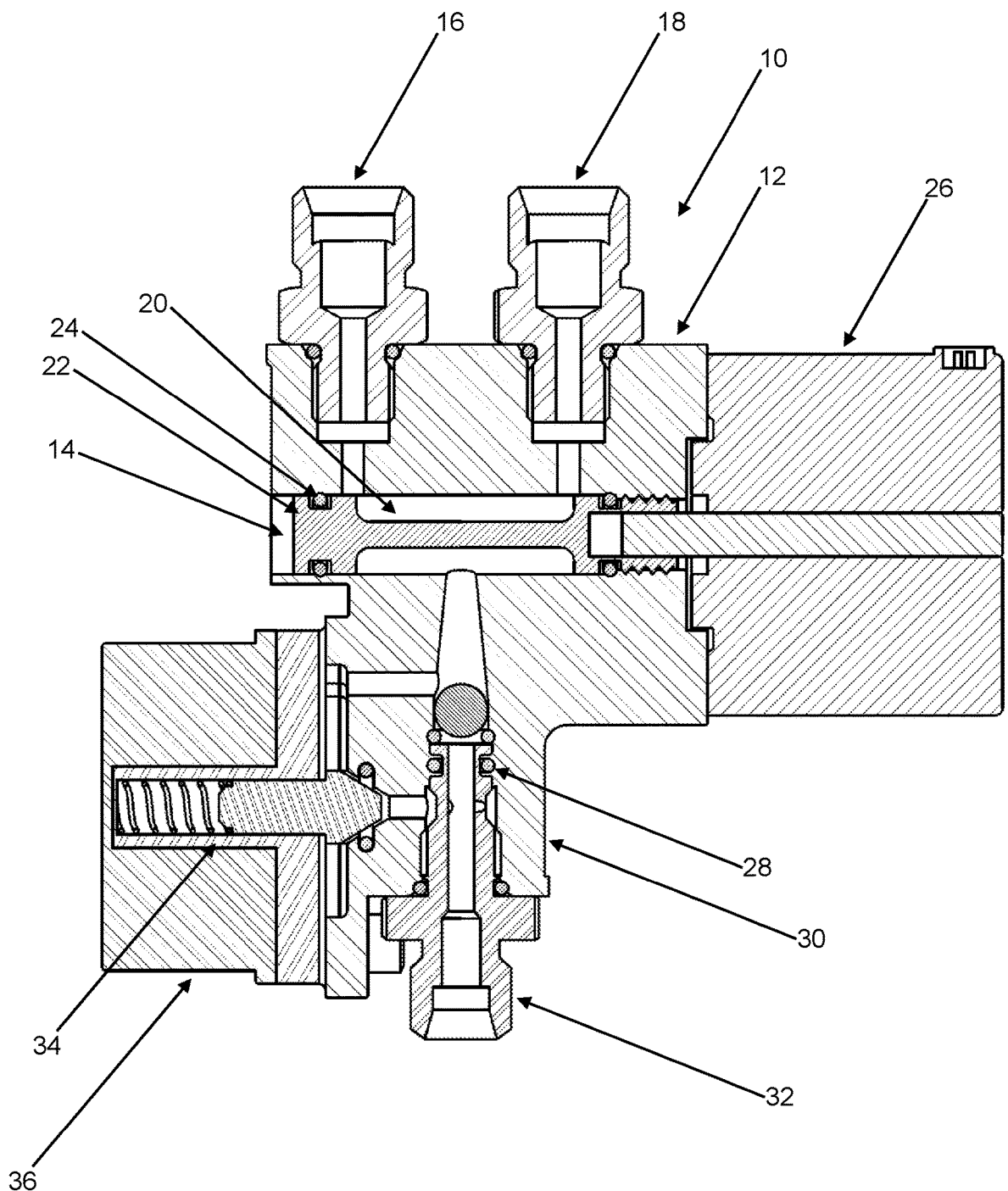
FIG. 2 is a cross-sectional side view of one exemplary embodiment of the shuttle valve temperature control assembly of the present disclosure.

Referring now specifically to FIGS. 1 and 2, the inventive concepts disclosed herein are generally directed to a shuttle valve temperature control assembly 10 that includes a housing 12 defining an internal fluid flow channel 14. The housing 12 may be manufactured from a metallic material, polymeric material, composite material, or the like and is preferably water tight. The internal fluid flow channel 14 is in fluid communication with a hot water inlet 16 that supplies a hot water flow and a cold water inlet 18 that supplies a cold water flow. A shuttle valve 20 is disposed within the internal fluid flow channel 14 and is translated and/or rotated to simultaneously partially or wholly obstruct the hot water flow from the hot water inlet 16 and the cold water flow from the cold water inlet 18 such that each contributes a predetermined proportional water flow to the internal fluid flow channel 14. In the exemplary embodiment illustrated, the shuttle valve 20 consists of a I-shaped metallic, polymeric, or composite translating slider 22 that partially obstructs both the hot water flow from the hot water inlet 16 and the cold water flow from the cold water inlet 18. This translating slider 22 is conformally fluidly sealed within the internal fluid flow channel 14 using a plurality of O-rings 24, for example. When the translating slider 22 is translated in one direction, it permits relatively more hot water flow from the hot water inlet 16 and relatively less cold water flow from the cold water inlet 18, thereby resulting in a hotter mix in the internal fluid flow channel 14. When the translating slider 22 is translated in the opposite direction, it permits relatively more cold water flow from the cold water inlet 18 and relatively less hot water flow from the hot water inlet 16, thereby resulting in a colder mix in the internal fluid flow channel 14. It will be readily apparent to those of ordinary skill in the art that partial or complete rotational actuation is also possible.

The shuttle valve 20 is coupled to and actuated by a servo motor 26 or the like. Preferably, this servo motor 26 allows the shuttle valve 20 to be actuated in a continuous manner, such that a continuous range of resulting water temperatures can be achieved in the internal fluid flow channel 14 from a low water temperature associated with the cold water inlet 18, due to no hot water input being provided, to a high water temperature associated with the hot water inlet 16, due to no cold water input being provided. It will be readily apparent to those of ordinary skill in the art, however, that other types of motors and actuations mechanisms 26 can also be used, such as a stepper motor or the like, or the shuttle valve 20 may be actuated mechanically/manually, via a spring, lever, and/or rotational mechanism, for example. The key functionality is that the actuation mechanism 26 selectively varies the hot water/cold water mix coming from the hot water inlet 16 and the cold water inlet 18. The control mechanism utilized is described in greater detail herein below.

The internal fluid flow channel 14 is in fluid communication with an internal fluid delivery channel 28 defined within the housing 12 or within another housing 30 coupled to and/or integrally formed with the housing 30. Optionally, turbulent mixing of the hot and cold water flows is promoted within the internal fluid delivery channel 28, such that a potentially heterogeneous hot/cold water mix within the internal fluid flow channel 14 is made homogeneous in the internal fluid delivery channel 28 prior to being delivered to the warm water outlet port 32. This may be achieved via a partially or wholly tapered shape, for example. The warm water outlet port 32 may be coupled to the outlet of the associated faucet/spigot (not illustrated) or it may itself act as the outlet of the associated faucet/spigot. Accordingly, the shuttle valve temperature control assembly 10 described herein may be disposed under a sink or at the point of warm water delivery itself, as dictated by the given application.

The mixing of hot and cold water sources is accomplished through the use of a shuttle-type valve or other valve. The valve generally covers and uncovers two ports leading from the hot and cold water sources. As the valve moves, for example translates horizontally and/or rotates, the corresponding change in flow rates between the two ports allows a varying mixture ratio of the hot and cold streams. The valve design also includes a chamber wherein turbulent mixing of the hot and cold inlet water occurs, facilitating an outlet water flow that is homogeneous in temperature.

The position of the valve is controlled by the stepper, servo or other motor 26. Rotation of the motor 26 causes the shuttle valve 20 to rotate within the mixing chamber or bore. In one particular embodiment, threads on one end of the shuttle valve 20 engage on the housing 12 and cause the shuttle valve 20 to translate.

FIG. 2 shows a preferred embodiment of the hot and cold water mixing assembly generally at reference numeral 10. The assembly 10 includes a housing 12 having a hot water inlet 16, a cold water inlet 18, an internal mixing chamber, and a water outlet 32. The hot water inlet 16 supplies an inlet flow of hot water to the internal mixing chamber, while the cold water inlet 18 supplies a flow of cold water to the internal mixing chamber. The two inlets 16, 18 are spaced apart and separate, and each is in fluid communication with and opens through a common wall of the internal mixing chamber such that the single shuttle valve 20 described below controls water flow through both inlets 16, 18 simultaneously.

The shuttle valve 20 is translatably and rotatably disposed within the internal mixing chamber. The shuttle valve 20 can be sealed at opposing ends thereof to seal the internal mixing chamber. The valve 20 is associated with and arranged to translate and rotate relative to the hot water inlet 16 and the cold water inlet 18 to control water flow through the inlets 16, 18 into the internal chamber. In FIG. 2, the valve 20 is positioned to cover respective portions of each inlet 16, 18, thereby controlling respective amounts of flow through each inlet 16, 18 into the internal mixing chamber. Thus, as shown, corresponding amounts of hot and cold water from the two inlets 16, 18 are able to flow into the internal mixing chamber.

The internal fluid delivery channel 28 may be selectively obstructed by an on-off obstruction valve 34 that selectively blocks the flow of warm water from the warm water outlet port 32. Numerous types of such obstruction valves 34 are well known to those of ordinary skill in the art and all may be used equally. The obstruction valve 34 may also operate to stop water flow in other portions of the overall warm water delivery system.

Optionally, the obstruction valve 34 is coupled to and actuated by another servo motor 36 or the like. Preferably, this servo motor 36 allows the obstruction valve 34 to be actuated in a continuous manner, such that a continuous range of resulting water pressures can be provided for hand washing or the like. It will be readily apparent to those of ordinary skill in the art, however, that other types of motors and actuations mechanisms 36 can also be used, such as a stepper motor or the like, or the obstruction valve 34 may be actuated mechanically/manually, via a spring, lever, and/or rotational mechanism, for example. The key functionality is that the on-off mechanism 36 selectively varies the water pressure available at the outlet port 32. The control mechanism utilized is again described in greater detail herein below.

In an alternative exemplary embodiment, on-off functionality is provided simultaneously by the shuttle valve 20. In this exemplary embodiment, the shuttle valve 20 incorporates a neutral position at which no water flow is provided from either the hot water inlet 16 or the cold water inlet 18 to the internal fluid flow channel 14 and or the internal fluid deliver channel 28, for example.

Either or both motors 26 and 36 may be controlled electronically, such that a given warm water temperature at the outlet port 32 may be set by a technician and/or selected by a user. For example, a touch interface or the like may be utilized. In such cases, a processor and memory are preferably utilized. The processor is a hardware device for executing software instructions. The processor can be any custom made or commercially available processor, a central processing unit (CPU), an auxiliary processor among several processors associated with the memory, a semiconductor-based microprocessor (in the form of a microchip or chip set), or generally any device for executing software instructions. The processor is configured to execute software stored within the memory, to communicate data to and from the memory, and to generally control operations of the motors 26 and/or 36 pursuant to the software instructions. In an exemplary embodiment, the processor may include a mobile optimized processor, such as optimized for power consumption and mobile applications. I/O interfaces can be used to receive user input from and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a graphical user interface (GUI) that enables a user to interact with the memory. Additionally, the I/O interfaces may further include an imaging device, i.e. camera, video camera, etc.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionality in communication with the shuttle valve temperature control assembly 10.

Figure 3:
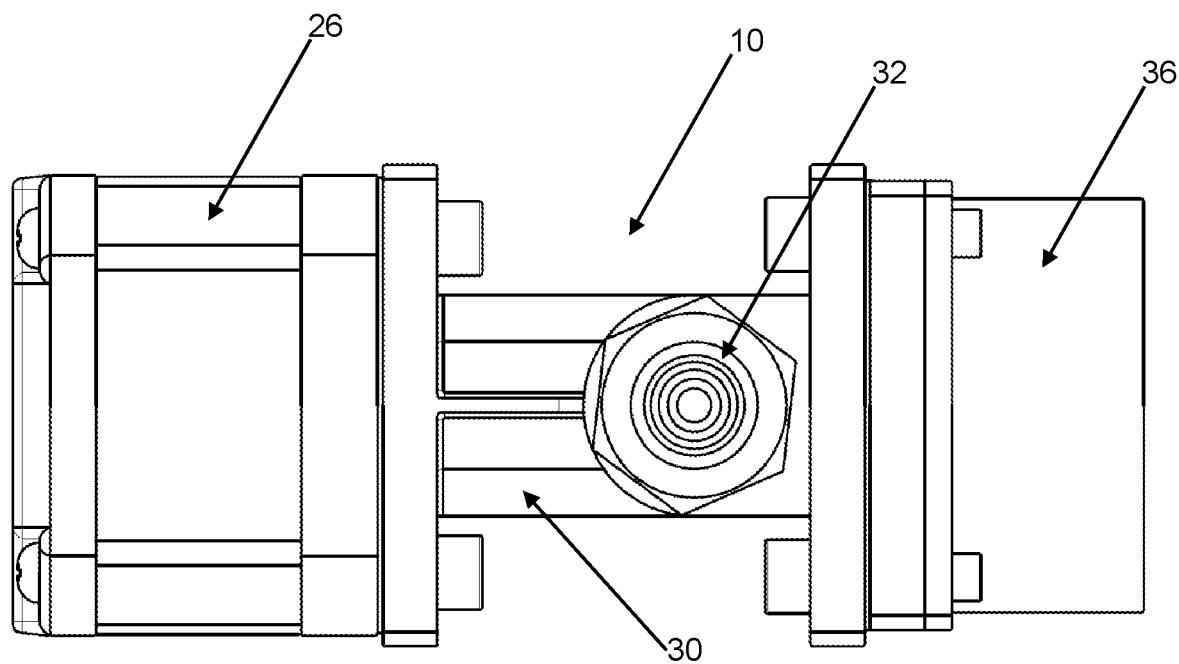
FIG. 3 is a planar end view of one exemplary embodiment of the shuttle valve temperature control assembly of the present disclosure.

FIG. 3 is a planar end view of the shuttle valve temperature control assembly 10, highlighting the motors 26 and 36 and the output port 32.

Figure 4:
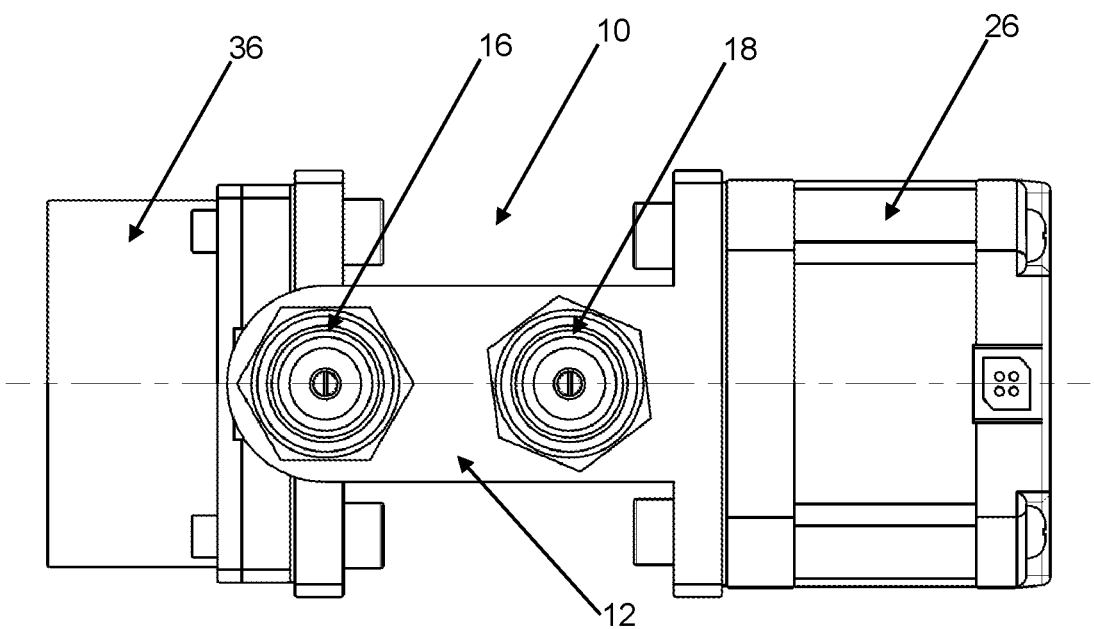
FIG. 4 is another planar end view of one exemplary embodiment of the shuttle valve temperature control assembly of the present disclosure.

FIG. 4 is another planar end view of the shuttle valve temperature control assembly 10, highlighting the motors 26 and 36 and the hot and cold water inlets 16 and 18.

Figure 5:
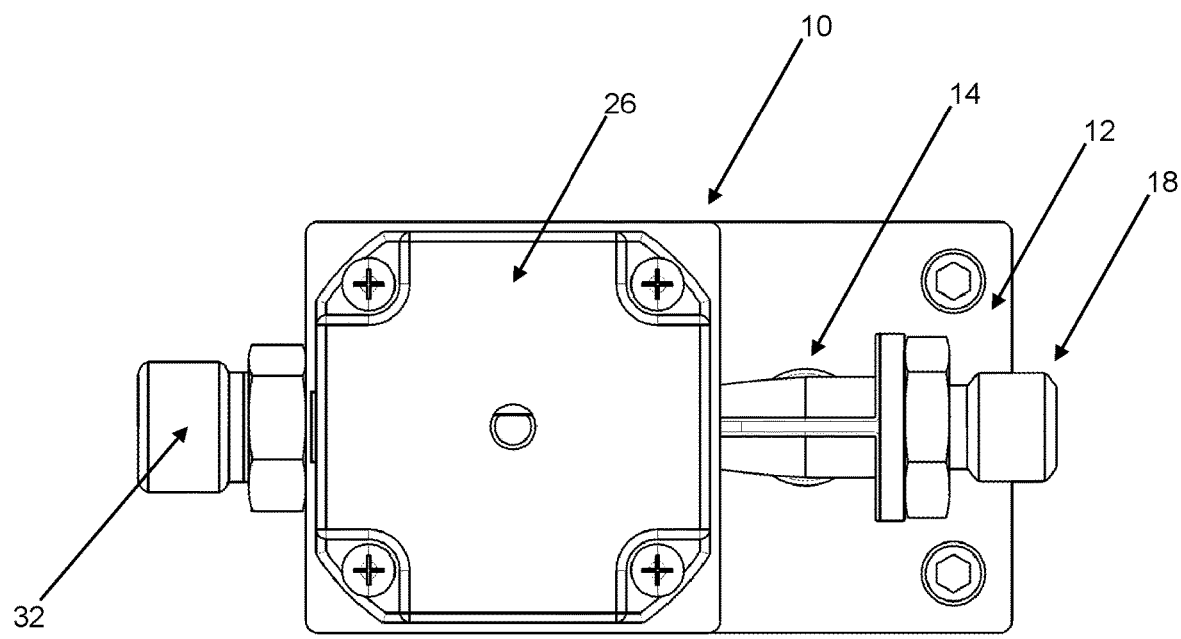
FIG. 5 is a further planar end view of one exemplary embodiment of the shuttle valve temperature control assembly of the present disclosure.

FIG. 5 is a further planar end view of the shuttle valve temperature control assembly 10, highlighting the motor 26, the hot water inlet 16, and the outlet port 32.

Figure 6:
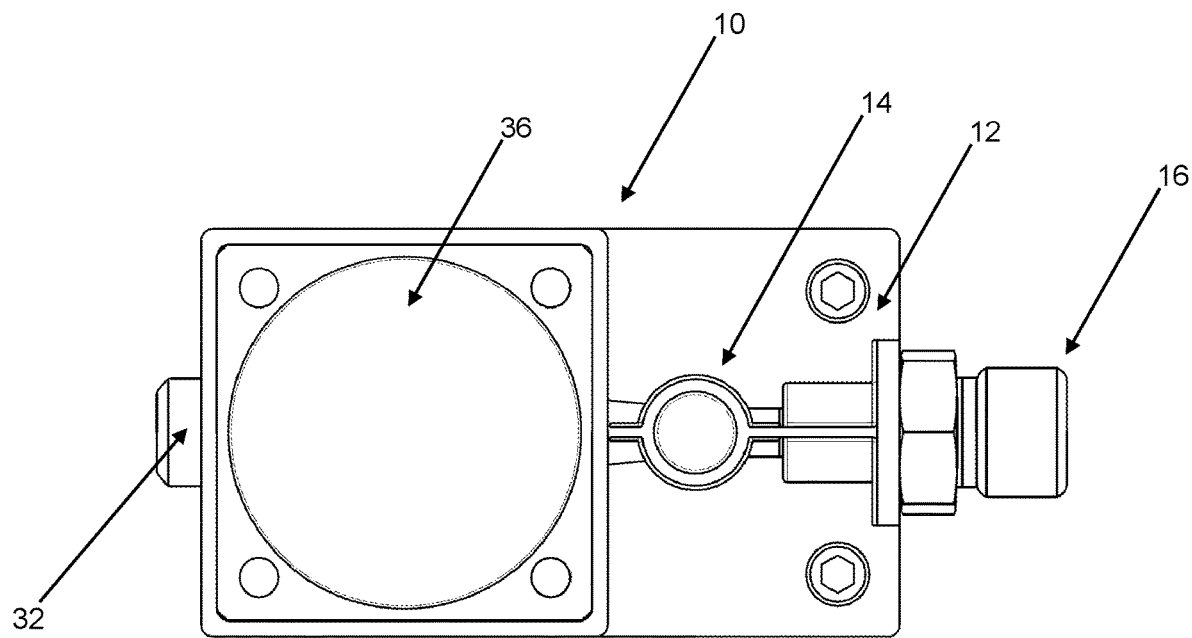
FIG. 6 is a still further planar end view of one exemplary embodiment of the shuttle valve temperature control assembly of the present disclosure.

FIG. 6 is a still further planar end view of the shuttle valve temperature control assembly 10, highlighting the motor 36, the cold water inlet 18, and the outlet port 32.

Figure 7:
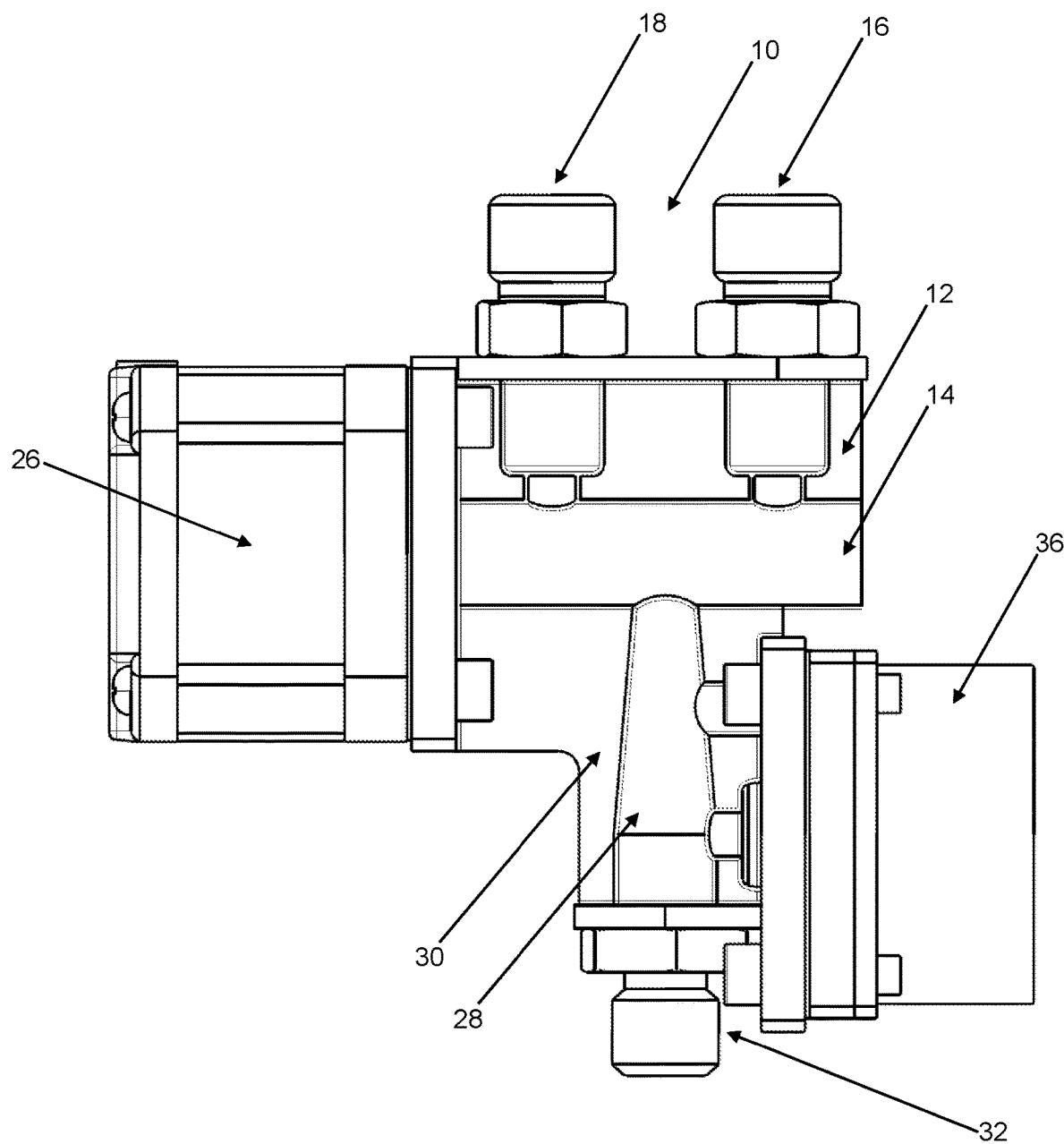
FIG. 7 is a planar side view of one exemplary embodiment of the shuttle valve temperature control assembly of the present disclosure.

FIG. 7 is a planar side view of the shuttle valve temperature control assembly 10 as illustrated in FIGS. 1 and 2.

Figure 8:
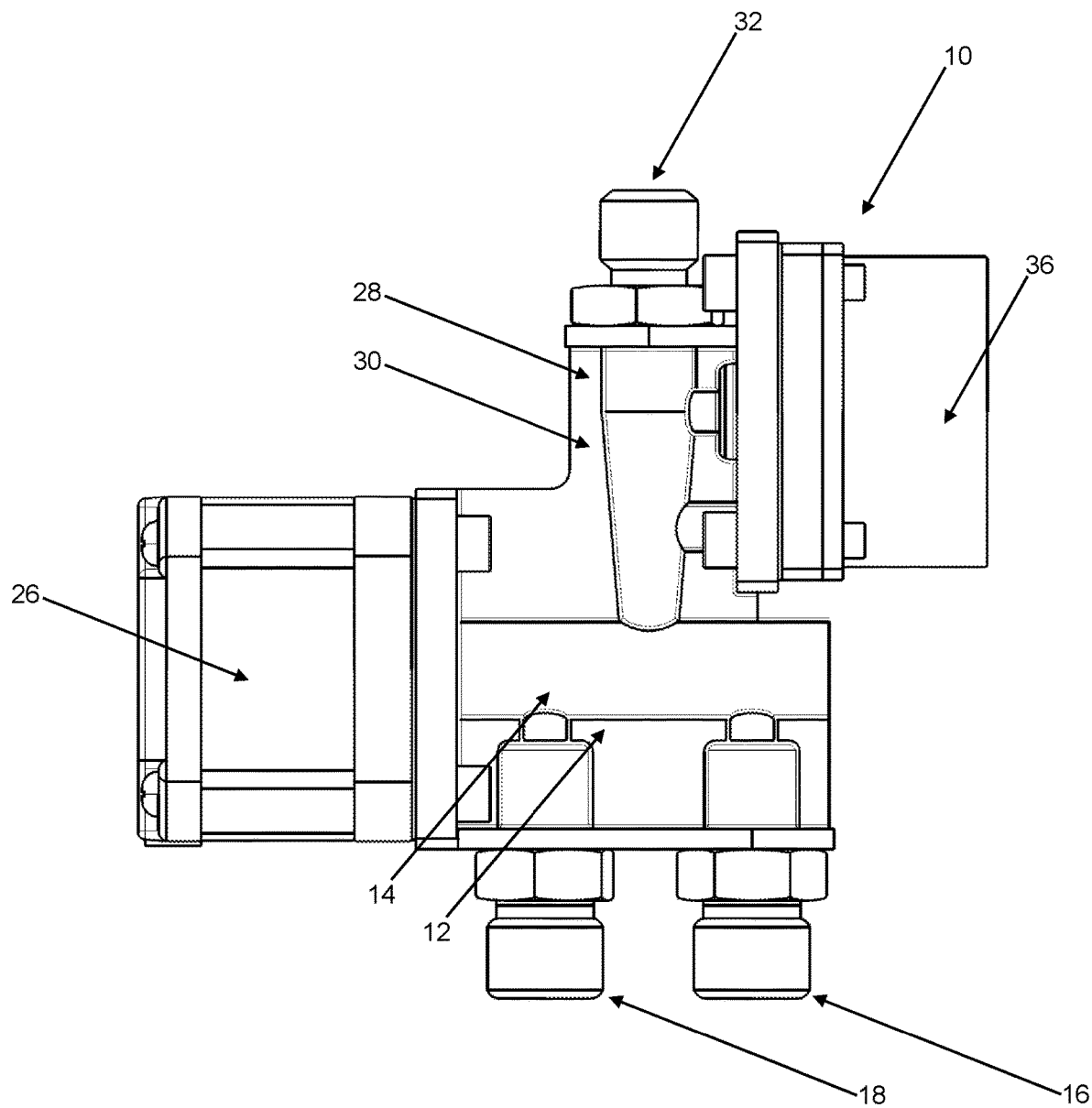
FIG. 8 is another planar side view of one exemplary embodiment of the shuttle valve temperature control assembly of the present disclosure.

FIG. 8 is another planar side view of the shuttle valve temperature control assembly 10 as illustrated in FIGS. 1 and 2.

Again, in various aspects, embodiments of the inventive concepts disclosed herein provide a valve assembly 10 for mixing water from hot and cold water sources to obtain water at a resulting temperature that is suitable for hand washing or the like, especially in an air transportation application or the like. More specifically, the present disclosure provides a shuttle valve temperature control assembly 10 incorporating a solenoid-controlled flow valve 34 and a servo-controlled shuttle valve 20 that is selectively translated and/or rotated to vary the relative flow rates of both the hot and cold water flows to achieve a resulting water mixture that has a desired temperature. Virtually any resulting temperature from the low temperature of the cold water flow alone to the high temperature of the hot water flow alone is thereby achievable, with a desirably high degree of user selectivity.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A valve assembly for mixing water from hot and cold water sources to obtain water at a resulting intermediate temperature, the valve assembly comprising:
   a housing defining an internal fluid flow channel in fluid communication with a hot water inlet port that selectively supplies a hot water flow perpendicular to the internal fluid flow channel and a cold water inlet port that selectively supplies a cold water flow perpendicular to the internal fluid flow channel, the hot water inlet port and the cold water inlet port spaced apart along a longitudinal length of the internal fluid flow channel; and
   a valve member disposed within the internal fluid flow channel, the valve member selectively positionable within the fluid flow channel to wholly obstruct only the cold water inlet port, wholly obstruct only the hot water inlet port, or partially obstruct each of the hot water inlet port and the cold water inlet port simultaneously,
   wherein the valve member comprises a translating slider having a length greater than a distance between the hot water inlet port and the cold water inlet port and the translating slider including a middle portion forming an annular mixing chamber along a length of the internal fluid flow channel disposed between opposing ends of the translating slider each of which seals one end of the annular mixing chamber, each of the hot water inlet port and the cold water inlet port selectively supplying their respective hot and cold water flow to the annular mixing chamber perpendicular to an axial direction of the mixing chamber.

2. The valve assembly of claim 1, wherein the translating slider translates when rotated within the internal fluid flow channel.

3. The valve assembly of claim 2, wherein threads on one of the opposing ends of the translating slider engage the housing and cause the translating slider to translate when rotated.

4. The valve assembly of claim 1, wherein the valve assembly is configured to be actuated in a continuous manner such that a continuous range of resulting water temperatures can be achieved in the internal fluid flow channel from a low water temperature associated with the cold water inlet to a high water temperature associated with the hot water inlet.

5. The valve assembly of claim 1, wherein the annular mixing chamber is in fluid communication with an internal fluid delivery channel defined within one or more of the housing and another housing coupled to or integrally formed with the housing, wherein turbulent mixing of the hot and cold water flows is promoted within the annular mixing chamber such that a potentially heterogeneous hot/cold water mix from the annular mixing chamber is made homogeneous in the internal fluid delivery channel.

6. The valve assembly of claim 1, further comprising a water outlet port coupled to the housing, wherein the water outlet port is configured to be coupled to an outlet of a faucet.

7. The valve assembly of claim 1, further comprising an on-off obstruction valve coupled to the internal fluid flow channel configured to selectively block a flow of warm water from the internal fluid flow channel.

8. The valve assembly of claim 7, wherein the on-off obstruction valve is coupled to and actuated by an electric motor.

9. The valve assembly of claim 1, wherein the valve assembly is disposed on an aircraft.

10. A faucet, comprising:
a valve assembly for mixing water from hot and cold water sources to obtain water at a resulting intermediate temperature, the valve assembly comprising:
a housing defining an internal fluid flow channel in fluid communication with a hot water inlet port that selectively supplies a hot water flow perpendicular to the internal fluid flow channel and a cold water inlet port that selectively supplies a cold water flow perpendicular to the internal fluid flow channel, the hot water inlet port and the cold water inlet port spaced apart along a longitudinal length of the internal fluid flow channel; and
a valve member disposed within the internal fluid flow channel, the valve member selectively positionable within the fluid flow channel to wholly obstruct only the cold water inlet port, wholly obstruct only the hot water inlet port, or partially obstruct each of the hot water inlet port and the cold water inlet port simultaneously,
wherein the valve member comprises a translating slider having a length greater than a distance between the hot water inlet port and the cold water inlet port and the translating slider including a middle portion forming an annular mixing chamber along a length of the internal fluid flow channel disposed between opposing ends of the translating slider each of which seals one end of the annular mixing chamber, and the translating slider movable in an axial direction of the internal fluid flow channel and radially relative to each of the hot and cold water inlet ports.

11. The faucet of claim 10, wherein the translating slider translates when rotated within the internal fluid flow channel.

12. The faucet of claim 11, wherein threads on one of the opposing ends of the translating slider engage the housing and cause the translating slider to translate when rotated.

13. The faucet of claim 10, wherein the valve assembly is configured to be actuated in a continuous manner such that a continuous range of resulting water temperatures can be achieved in the internal fluid flow channel from a low water temperature associated with the cold water inlet to a high water temperature associated with the hot water inlet.

14. The faucet of claim 10, wherein the annular mixing chamber is in fluid communication with an internal fluid delivery channel defined within one or more of the housing and another housing coupled to or integrally formed with the housing, wherein turbulent mixing of the hot and cold water flows is promoted within the annular mixing chamber such that a potentially heterogeneous hot/cold water mix from the annular mixing chamber is made homogeneous in the internal fluid delivery channel.

15. The faucet of claim 10, wherein the valve assembly further comprises a water outlet port coupled to the housing, wherein the water outlet port is configured to be coupled to an outlet of the faucet.

16. The faucet of claim 10, wherein the valve assembly further comprises an on-off obstruction valve coupled to the internal fluid flow channel configured to selectively block a flow of warm water from the internal fluid flow channel.

17. The faucet of claim 16, wherein the on-off obstruction valve is coupled to and actuated by an electric motor.

18. The faucet of claim 10, wherein the faucet is disposed on an aircraft.

* * * * *